Oct. 23, 1928.
A. R. TEARE
1,688,363
HEATING AND VENTILATING APPARATUS
Filed Jan. 26, 1928   2 Sheets-Sheet 1
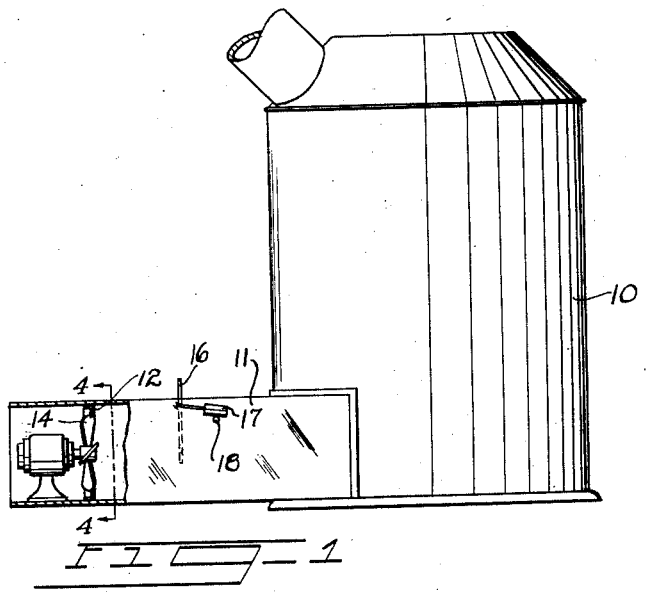
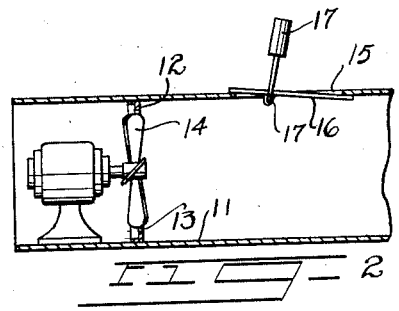
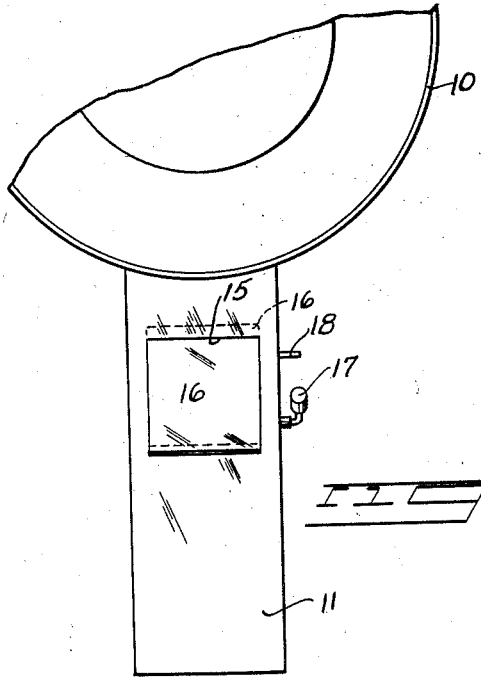
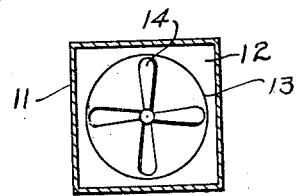
Inventor
Albert R. Teare
By Bates, Macklin, Gobrick & Teare
Attorneys Oct. 23, 1928.

A. R. TEARE 1,688,363

HEATING AND VENTILATING APPARATUS

Filed Jan. 26, 1928     2 Sheets-Sheet 2

Inventor

Albert R. Teare

By Bates, Macklin, Golrick & Teare

Attorneys

Patented Oct. 23, 1928.

1,688,363

UNITED STATES PATENT OFFICE.

ALBERT R. TEARE, OF LAKEWOOD, OHIO, ASSIGNOR TO JAMES C. MILES, OF CLEVELAND, OHIO.

HEATING AND VENTILATING APPARATUS.

Application filed January 26, 1928. Serial No. 249,571.

This invention relates to heating and ventilating apparatus, particularly that which is intended for use in connection with the operation of a hot air heating furnace. In order to insure positive and uniform distribution of air from the furnace through the various delivery pipes and into the rooms to be heated, it is advantageous to utilize a fan which is placed at or near the inlet to the heating chamber of the furnace and to operate the fan at certain intervals. Ordinarily a certain area of inlet opening is required to maintain an adequate volume of air through the heating chamber under the gravity system. Accordingly, if a fan is placed in the opening, provision must be made for allowing all of the air entering the chamber to be forced therein through the fan opening and provision must also be made for providing adequate opening area when the fan is stopped so as to prevent the furnace from being burned out.

The principal object of the present invention is to provide an apparatus which includes a fan and a damper which are associated with the inlet passageway to the heating chamber of a hot air furnace and are so arranged that the damper must be manually closed whenever the fan is started, thus insuring the entire passage of air set in motion by the fan into the furnace chamber.

A further object of my invention is to so arrange the damper that it is moved automatically to the open position when the fan is stopped. Thus, the danger of burning out the furnace due to forgetfulness by the operator is minimized.

Figure 5:
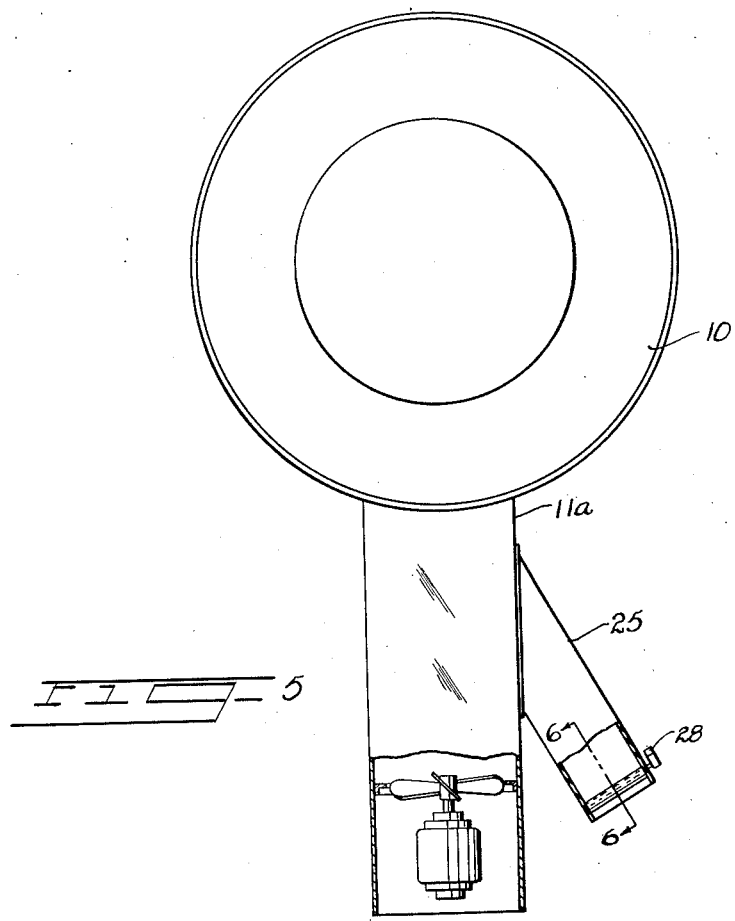
Figure 6:
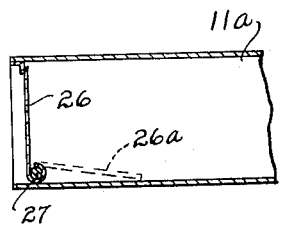

In the drawings, Fig. 1 is a side elevation of a hot air furnace showing a part of the inlet conduit in section; Fig. 2 is a longitudinal vertical section through the conduit on a slightly enlarged scale from that shown in Fig. 1; Fig. 3 is a plan view of part of the furnace inlet conduit; Fig. 4 is a transverse section taken through the conduit on a plane indicated by the line 4—4 in Fig. 1; Fig. 5 is a plan view of a furnace showing a modified form of damper arrangement; Fig. 6 is a vertical section taken through part of the conduit on a plane indicated by the line 6—6 in Fig. 5; and Fig. 7 is a side elevation of the damper conduit shown in Fig. 5.

Referring now to Figs. 1 to 4, 10 designates a hot air furnace having an air inlet conduit indicated at 11. A partition 12 is indicated as extending across the conduit, and as having a fan opening 13 therein. A motor driven fan 14 is positioned within the conduit in such manner that the fan occupies substantially the entire fan opening. Thus, when the fan is in operation air is intended to be forced through the conduit and into the heating chamber.

Between the fan and the furnace chamber I have shown a damper opening 15 in the top wall of the conduit. A damper 16 is pivotally mounted at 17 on a horizontal axis, and is normally held in open position as indicated in Fig. 1 when the fan is stopped. A convenient way for insuring that the damper is held in open position is to utilize a weighted arm 17 which may form a continuation of the damper pivot and may be arranged to engage a stop at 18 on the side wall of the conduit. The weight of the member 17 is such that the velocity pressure of air which may be set in motion by the fan is not sufficient to move the damper to the closed position shown in Fig. 2. Accordingly, to insure passage of air under pressure into the heating chamber and thence to the outlet pipes, it is necessary to raise the arm 17, thus moving the damper to closed position as illustrated in Fig. 2. In such position, the arm is nearly vertical, and hence the velocity pressure is sufficient to maintain the damper closed, but as soon as the fan is stopped, the slight overbalancing of one side of the damper causes it to move automatically to the open position.

Figure 7:
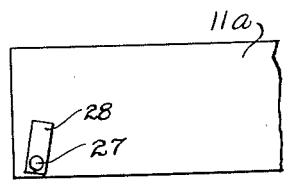

A modified form of my invention is shown in Figs. 5, 6 and 7 wherein an auxiliary conduit 25 leads at an angle into the conduit 11ª. Within the auxiliary conduit I have shown a damper 26 which is pivotally mounted at 27 near the bottom of the conduit and is intended to be operated by an arm 28 from a point outside the conduit. Normally the damper is in the position shown by the broken lines 26ª in Fig. 6 when the fan is stopped. When the fan is in motion, however, the pressure is built up within the main and auxiliary conduits, and hence if the damper is moved manually to the closed position, as shown by the full lines in Fig. 6, then the pneumatic pressure within the conduit is sufficient to maintain the damper closed. The arm 28 being weighted, however, and being slightly inclined to the vertical when the damper is closed, tends to automatically open the damper as soon as the fan is stopped.

An apparatus made in accordance with my invention is advantageous in that the operator must positively close the damper when the fan is started, thus insuring the passage of air under pressure into the heating chamber when the fan is started. On the other hand, the automatic opening of the damper when the fan is stopped insures an adequate area of inlet opening and prevents burning out of the furnace.

I claim:

1. In combination with the heating chamber of a hot air furnace having an air inlet conduit leading thereto, of a motor driven fan associated with the conduit and arranged for forcing air under pressure through the conduit into the heating chamber, said conduit having an opening admitting air into that portion between the fan and heating chamber, and a closure for said opening, said closure embodying means operative to maintain it in open position against pneumatic pressure of the fan but inoperative to open it against said pneumatic pressure.

2. In combination, an air conduit, a motor driven fan associated therewith for forcing air under pressure therethrough, said conduit having an opening for admitting air thereinto independently of the fan, a closure for said opening, said closure embodyig a pivoted member, the pivot being on one side of the center of gravity thereof, whereby the closure is normally maintained in open position against pneumatic pressure of the fan but when closed is maintained in closed position by such pneumatic pressure.

3. The combination of an air conduit, a motor driven fan for forcing air therethrough, said conduit having an opening through which air may be admitted into the conduit on the pressure side of the fan and independently of the fan, a pivoted closure for said opening, said closure having a counterweight associated therewith and functioning to maintain the closure in open position against pneumatic pressure of the fan, and said counterweight being rendered inoperative to open the closure against such pneumatic pressure after the closure is moved to closed position.

In testimony whereof, I hereunto affix my signature.

ALBERT R. TEARE.